US012006112B2

(12) United States Patent
Waterman et al.

(10) Patent No.: US 12,006,112 B2
(45) Date of Patent: Jun. 11, 2024

(54) POLYMERIC ARTICLES WITH ELECTRONIC CODE FORMED THEREON AND PROCESS OF MAKING THE SAME

(71) Applicant: Berry Global, Inc., Evansville, IN (US)

(72) Inventors: Jared B. Waterman, Evansville, IN (US); Jonathan Eickhoff, Evansville, IN (US); Jennye Scott, Evansville, IN (US); Kirk Birchler, Mount Vernon, IN (US); Jeffrey A. Mann, Evansville, IN (US)

(73) Assignee: Berry Global, Inc., Evansville, IN (US)

( * ) Notice: Subject to any disclaimer, the term of this patent is extended or adjusted under 35 U.S.C. 154(b) by 104 days.

(21) Appl. No.: 17/177,748

(22) Filed: Feb. 17, 2021

(65) Prior Publication Data

US 2021/0253318 A1 Aug. 19, 2021

Related U.S. Application Data

(60) Provisional application No. 62/978,047, filed on Feb. 18, 2020.

(51) Int. Cl.
*B29C 51/10* (2006.01)
*B29C 33/42* (2006.01)
*B29C 48/08* (2019.01)
*B65D 51/24* (2006.01)
(Continued)

(52) U.S. Cl.
CPC .......... *B65D 51/245* (2013.01); *B29C 33/424* (2013.01); *B29C 48/08* (2019.02); *B29C 51/10* (2013.01); *G09F 3/0297* (2013.01); *B29L 2031/7132* (2013.01)

(58) Field of Classification Search
CPC ....... B29C 33/424; B29C 51/10; B29C 48/08; B29L 2031/7132; G09F 3/0297
See application file for complete search history.

(56) References Cited

U.S. PATENT DOCUMENTS

| 5,633,022 A * | 5/1997 | Myers ..................... B29C 51/40 |
| | | 264/522 |
| 2010/0046825 A1* | 2/2010 | Haushalter ............ B29C 45/372 |
| | | 382/141 |
| 2011/0153398 A1 | 6/2011 | Tjhai |

(Continued)

FOREIGN PATENT DOCUMENTS

| EP | 0773505 A2 | 5/1997 |
| WO | 2013036692 A2 | 3/2013 |

(Continued)

OTHER PUBLICATIONS

International (PCT) Search Report and Written Opinion for PCT/US2022/045217 dated Jan. 18, 2023, BP-578 PCT || (5723-327737), 9 pages.

(Continued)

*Primary Examiner* — Farah Taufiq
(74) *Attorney, Agent, or Firm* — Barnes & Thornburg LLP (57) ABSTRACT

A polymeric article includes a body and encoded visual indicia formed on the body. The encoded visual indicia may be scanned to generate instructions. A method of providing the polymeric article includes applying polymeric materials to a mold to provide an article-blank web having formed therein an article preform of a desired shape with encoded visual indicia formed in the article preform.

16 Claims, 10 Drawing Sheets

(51) Int. Cl.
*G09F 3/00* (2006.01)
*B29L 31/00* (2006.01)

(56) References Cited

U.S. PATENT DOCUMENTS

| | | | |
|---|---|---|---|
| 2012/0034329 A1 | 2/2012 | Mazzarolo | |
| 2013/0346169 A1* | 12/2013 | Tjhai | G06Q 30/0603 |
| | | | 705/39 |
| 2015/0290872 A1* | 10/2015 | Juriasingani | B32B 7/12 |
| | | | 264/293 |
| 2018/0290798 A1* | 10/2018 | Peng | B65D 43/0208 |
| 2019/0039328 A1* | 2/2019 | Eickhoff | B29C 48/0011 |
| 2019/0306385 A1* | 10/2019 | Sharma | B42D 25/333 |
| 2020/0247034 A1 | 8/2020 | Eickhoff | |
| 2021/0253318 A1 | 8/2021 | Waterman | |
| 2022/0004832 A1* | 1/2022 | Doheny | G06K 19/06028 |

FOREIGN PATENT DOCUMENTS

| | | |
|---|---|---|
| WO | 2020239873 A1 | 12/2020 |
| WO | 2021167971 A1 | 8/2021 |
| WO | 2021252298 A1 | 12/2021 |

OTHER PUBLICATIONS

International (PCT) Search Report and Written Opinion for PCT/US2022/045217 dated (Jan. 18, 2023), BP-578 PCT ‖ (5723-372737), 9 pages.

Extended European Search Report for Counterpart EP21757306.2 dated Feb. 13, 2024, BP-552 EP ‖, 11 pages.

International (PCT) Search Report and Written Opinion for PCT/US23/80026 dated Apr. 3, 2024, BP-583 PCT ‖, 9 pages.

* cited by examiner

POLYMERIC ARTICLES WITH ELECTRONIC CODE FORMED THEREON AND PROCESS OF MAKING THE SAME

PRIORITY CLAIM

This application claims priority under 35 U.S.C. § 119(e) to U.S. Provisional Application Ser. No. 62/978,047, filed Feb. 18, 2020, which is expressly incorporated by reference herein.

BACKGROUND

The present disclosure relates to polymeric articles, and particularly to polymeric articles with visual features formed thereon. More particularly, the present disclosure relates to polymeric articles with electronic code formed thereon.

SUMMARY

According to the present disclosure, an article may be formed with a molding method. The method may include a step of extruding polymeric material and a step of forming an article from the polymeric material such as rotary thermoforming, deep draw thermoforming, blow molding, injection molding, casting, molding on a tread of molds, flatbed thermoforming, etc.

In some embodiments, the step of extruding may include extruding a sheet. The method may further include a step of conditioning the sheet. The method may include a step of applying the sheet to a mold to provide an article-blank web. The article-blank web may be formed into one or more articles during the step of forming. The method may further include a step of separating the article out of the article-blank web to provide the article.

In some embodiments, the article may be formed with encoded visual indicia or information (sometimes called electronic code herein) on the article. The encoded visual indicia may be configured to be scanned by a computing device having an optical camera to cause the computing device to generate instructions based on the scanned encoded visual indicia.

In some embodiments, the sheet is applied to a mold having a pattern for forming the encoded visual indicia during the step of forming. The mold may include a plurality of features arranged in the pattern. The method may further include applying a vacuum to the mold to assist in urging portions of the sheet into or around the features to form the encoded visual indicia in the sheet. In some embodiments, the features in the mold include positive, negative, or a combination of positive and negative features to form the encoded visual indicia. Such features may include one or more of holes, slots, passages, depressions, protrusions, ridges, cells, wells, lobes etc.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
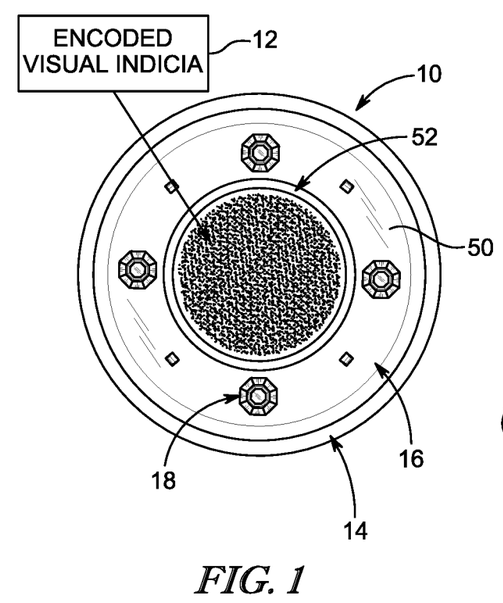
FIG. 1 is a perspective view of a polymeric lid according to the present disclosure formed by an article-manufacturing process shown in FIG. 3, the lid having formed thereon encoded visual indicia configured to be scanned by an optical camera.
Figure 2:
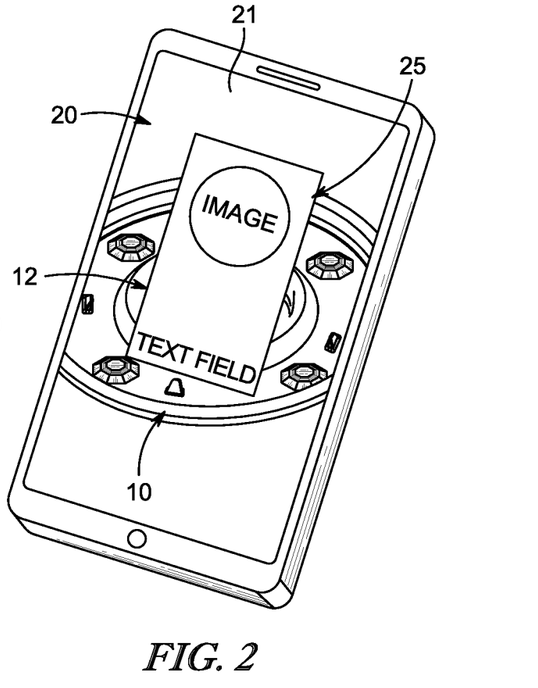
FIG. 2 is a perspective view of the encoded visual indicia of the lid of FIG. 1 being scanned by the optical camera of a mobile device and suggesting that the mobile device includes software to generate instructions to show an augmented reality with an image and text in response to scanning the encoded visual indicia formed on the lid.
Figure 3:
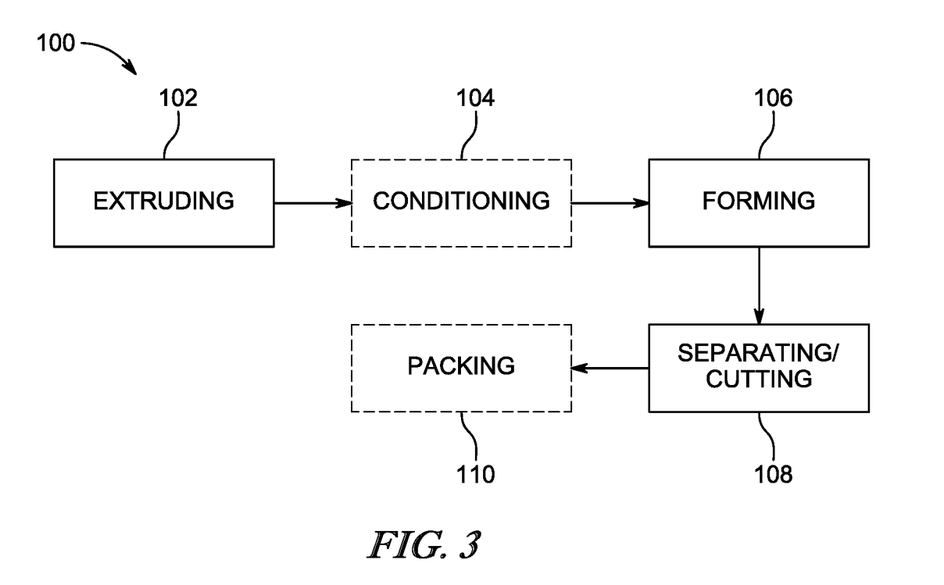
FIG. 3 is a diagrammatic view of an article-manufacturing process in accordance with the present disclosure for making an article using a thermoformer or other molding technique and showing that the article-manufacturing process includes stages or steps of extruding polymeric materials, optionally extruding the polymeric materials into a sheet and conditioning the sheet, forming the polymeric materials to form one or more articles, separating each article to provide the article shown, for example, in FIG. 1, and optionally packing each article for storage and/or transportation.

An article 10 in accordance with the present disclosure is shown, for example, in FIG. 1 and may be manufactured using a method 100 shown in FIG. 3. Article 10 is formed with encoded visual indicia 12 (sometimes called encoded information or electronic code) on article 10 as suggested in FIG. 1. Encoded visual indicia 12 may be scanned by an optical camera of a computing device 20 such as, for example, a mobile device, kiosk, or an industrial facility application as suggested in FIG. 2 such that encoded visual indicia 12 may be used for consumer, commercial, personal, or industrial applications. Once encoded visual indicia 12 is scanned, computing device 20 generates instructions based on the scanned encoded visual indicia 12.

As a non-exhaustive list of examples, the instructions may cause the computing device to display augmented reality that allows the user to interact with the augmented environment as suggested in FIG. 2, cause an image and/or text 25 to be displayed on a screen 21 of computing device 20, cause a sound to be played from a speaker connected with computing device 20, or cause the computing device to take a user to a predetermined website. The instructions may include information related to article 10 such as, for example, the materials from which article 10 is made for recyclability purposes, the date, time, and/or location of the manufacture of article 10, or the contents stored in article 10. In general, any suitable programmable instructions may be generated in response to scanning encoded visual indicia 12.

Illustratively, the encoded visual indicia 12 is provide by a plurality of depressions formed in article 10 which are arranged in a predetermined pattern as suggested in FIG. 1. The depressions extend downward away from a top surface of article 10 in the embodiment shown in FIG. 1. In other embodiments, the features may extend upwardly from the top surface and, therefore, may be called protrusions instead of depressions. Though the features are 3-dimensional, they may provide 2-dimensional shapes for the optical camera to scan. As such, the optical camera is configured to detect a pattern of 3-dimensional embossments or 2-dimensional indicia such as circles, lines, curves, or other discrete shapes such as squares, triangles, ovals, etc.

Article 10 may be for example, a lid 10 for a container as shown in FIG. 1, a cup, a bowl, a tray, a plate, a film, a container such as a pill container, storage container, tamper-evident container, a damage or tamper-evident indicator, an information indicator selector, a bottle, a cap, a closure, or any other suitable article. Illustratively, article 10 is a shallow draw article formed with a rotary thermoforming process, however aspects of the present disclosure may be incorporated in other article forming processes such as, for example, deep draw thermoforming, blow molding, injection molding, casting, molding on a tread of molds, flatbed thermoforming, compression molding, etc.

Lid 10 includes a ring-shaped brim mount 14, a central closure 16, and optionally a plurality of deformable product-identification domes 18 as shown, for example, in FIG. 1. Brim mount 14 is configured to mount with a brim included in a container. Central closure 16 is appended to brim mount 14 and adapted to block access into an interior storage region of the container. Product-identification domes 18 append from central closure 16 and are configured to move from an un-deformed arrangement to a deformed arrangement to indicate visually a selected flavor of a liquid beverage stored in the container. In some embodiments, deformable product-identification domes 18 are omitted from lid 10. Encoded visual indicia 12 may be formed in any portion of lid 10. Illustratively, encoded visual indicia 12 is formed in central closure 16 as shown in FIG. 1.

Figure 5A:
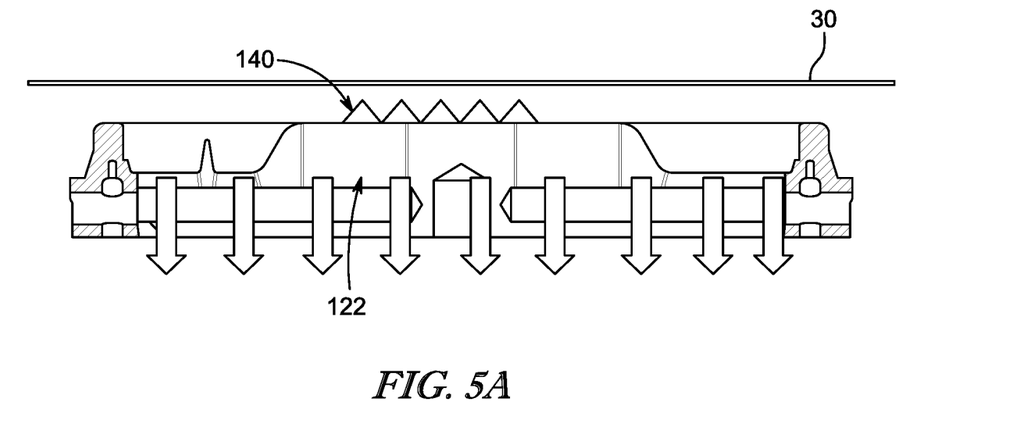
FIG. 5A is a diagrammatic view of the molding stage of the method shown in FIG. 3 and suggesting that a sheet of polymeric material is aligned with the mold having a plurality of features for forming the encoded visual indicia and a vacuum is applied to the mold to assist in the molding process.
Figure 5B:
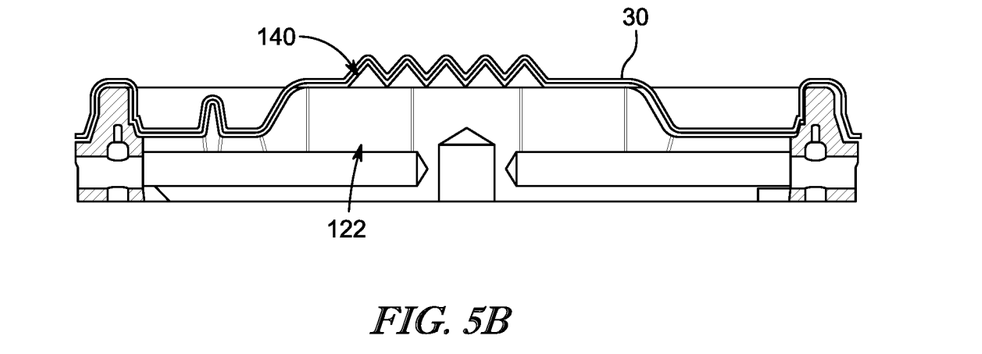
FIG. 5B is a diagrammatic view similar to FIG. 5A showing the sheet applied to the mold and portions of the sheet being formed around the plurality of features of the mold to form the encoded visual indicia on the article and to provide the article-blank web.
Figure 5C:
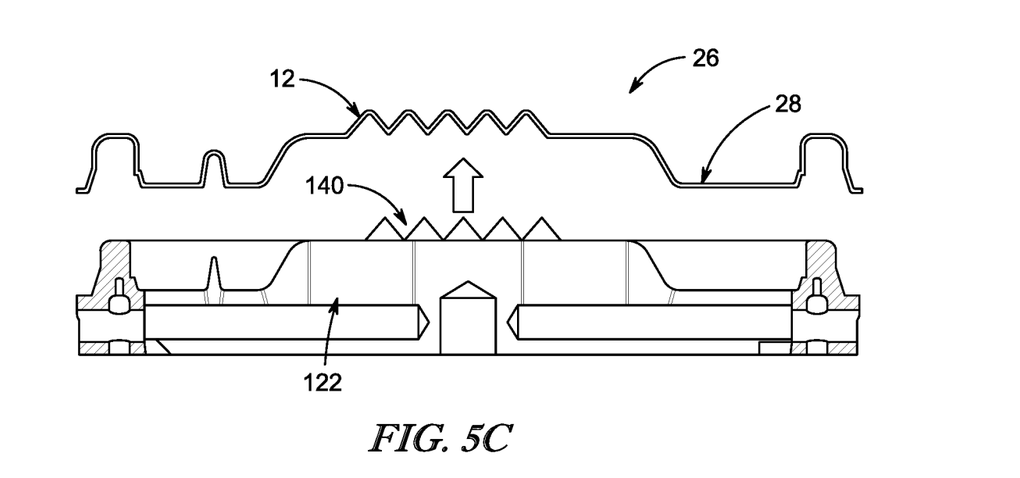
FIG. 5C is a diagrammatic view similar to FIG. 5B showing the article-blank web being separated from the mold and suggesting that the encoded visual indicia remains formed on the article.

The central closure 16 includes a ring-shaped basin 50 and a central dome 52 raised from the basin 50 as shown in FIGS. 1 and 5C. The ring-shaped basin extends circumferentially around the central dome 52. Each of the product-identification domes 18 is coupled to the ring-shaped basin 50. The central dome extends upwardly from the ring shaped basin in a generally central location of the lid 10. The encoded visual indicia 12 is formed on the central dome 52. In some embodiments, the encoded visual indicia 12 is formed only on the central dome 52. This provides an aesthetic appearance for the lid 10 while positioning the encoded visual indicia 12 in a location on the lid that is easily accessible for users and detectors, such as during a recycling process. In other embodiments, the central dome 52 may be offset from a center of the lid 10.

Manufacturing process 100 is illustratively an article-manufacturing process 100 for forming articles 10 as shown, for example, in FIG. 3. Article-manufacturing process 100 includes an extrusion stage 102, an optional conditioning stage 104, a molding or forming stage 106, an optional separating or cutting stage 108, and an optional packing stage 110. Extrusion stage 102 provides molten polymeric material that is used during the forming stage to produce one or more articles, such as lid 10. The polymeric material may be conditioned during conditioning stage 104 prior to forming stage 106. As previously described, one or more articles may be formed during forming stage 106 by a rotary thermoforming process, deep draw thermoforming, blow molding, injection molding, casting, molding on a tread of molds, flatbed thermoforming, or any other suitable forming process. Encoded visual indicia 12 is embossed on the article during forming stage 106. Once formed, each article may be separated from one another during separating stage 108. The articles may also be trimmed during separating stage 108. The articles may then be packaged for storage or transportation during packing stage 110. The articles may also be labeled or printed prior to packing stage 110.

In some embodiments, extrusion stage 102 includes extruding the polymeric material in the form of a sheet 30 of polymeric material. Conditioning stage 104 may be used to establish a desired surface finish, temperature, and feed rate of sheet 30. Molding stage 106 applies sheet 30 to a mold 22 to form an article-blank web 26 having encoded visual indicia formed on article-blank web 26. Separating stage 108 separates article 10 from the remaining material of article-blank web 26 to provide article 10 having encoded visual indicia 12 formed thereon. Illustratively, encoded visual indicia 12 is provided by a plurality of depressions that extend away from a surface of article 10 in a predetermined pattern.

Illustratively, molding stage 106 may include rotary thermoforming sheet 30. In other embodiments, molding stage 106 is replaced with another forming stage such as flatbed thermoforming, casting, injection molding, or blow molding. In other embodiments, conditioning stage 104 is omitted and sheet 30 of polymeric material is applied directly from extrusion stage 102 to molding stage 106 or other forming stage.

Figure 4A:
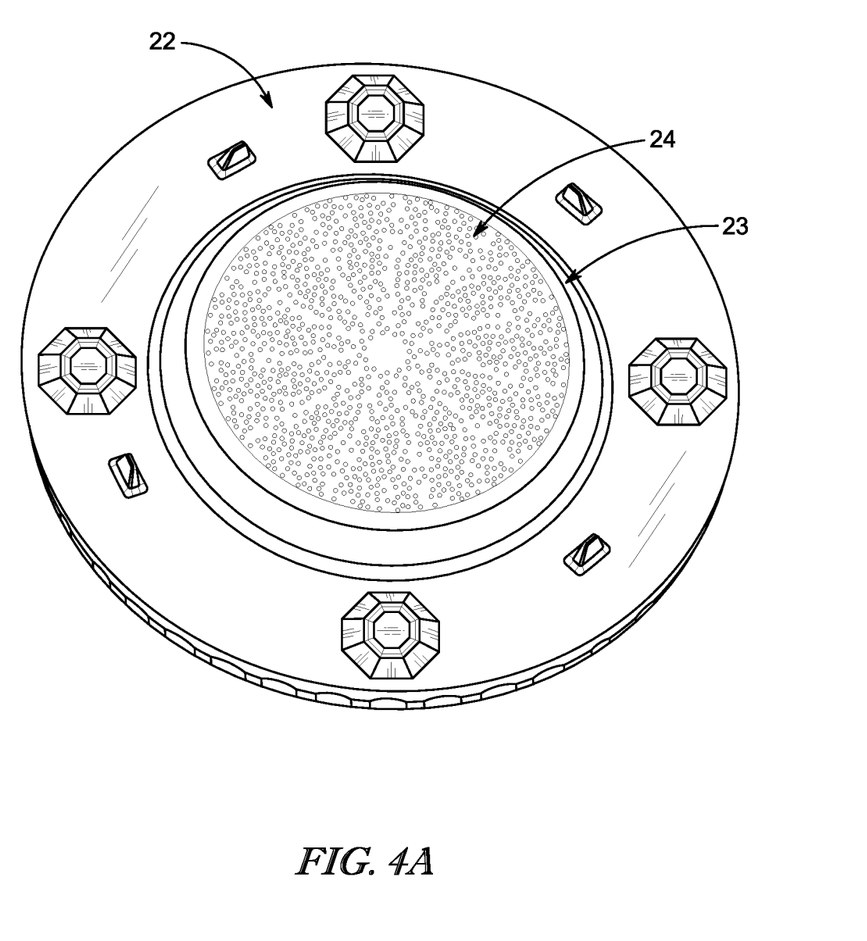
FIG. 4A is a perspective view of a mold tool used in the molding stage of the manufacturing method of FIG. 3, the mold tool having a plurality of features formed therein for forming the encoded visual indicia on the article during the molding stage.

During molding stage 106, sheet 30 is applied to a mold 22 shaped for forming the desired article 10 such as mold 22 shown in FIG. 4A. The illustrative mold 22 is shaped to provide lid 10. Mold 22 includes a plurality of features 24 arranged to provide encoded visual indicia 12 on lid 10. The plurality of features 24 may include holes, cells, lobes, nodes, wells, spikes, another feature shape, or a combination of two or more of these features. In some embodiments, mold 22 is formed to include slots or other shaped openings for forming encoded visual indicia 12. In other embodiments, mold 22 includes a plurality of male protrusions for forming encoded visual indicia 12. The plurality of features 24 may include a single pattern that repeats multiple times on article 10. The patterns may each be arranged at different orientations relative to a datum reference point, such as a center of the central dome 52, for example.

The size, shape, and spacing of the features that provide encoded visual indicia 12 may affect the repeatability and accuracy of scanning encoded visual indicia 12 with the optical camera. For example, the size of the features 24 or protrusions and the spacing between features 24 or protrusions on mold 22 may be chosen to maximize repeatable and successful scanning of the encoded visual indicia 12 provided by the features 24 by the optical camera. Illustratively, the encoded visual indicia 12 may be scanned by the optical camera at any orientation relative to the article 10 without any orienting features being formed and included with encoded visual indicia 12.

In some embodiments, the plurality of features 24 each have a depth (also called a height) within a range of about 0.005 inches to about 0.02 inches. In some embodiments, the plurality of features 24 each have a depth (or height) within a range of about 0.005 inches to about 0.015 inches. In some embodiments, the plurality of features 24 each have a depth (or height) within a range of about 0.005 inches to about 0.01 inches. In some embodiments, the plurality of features 24 each have a depth (or height) less than about 0.02 inches. In some embodiments, the plurality of features 24 each have a depth (or height) less than about 0.015 inches. In some embodiments, the plurality of features 24 each have a depth (or height) less than about 0.01 inches. In some embodiments, the plurality of features 24 each have a depth (or height) equal to about 0.01 inches. In some embodiments, the plurality of features 24 each have a depth (or height) equal to about 0.005 inches.

In some embodiments, the plurality of features 24 are each about 0.007 inches in diameter. In some embodiments, the plurality of features 24 are each about 0.010 inches in diameter. In some embodiments, the plurality of features 24 are each about 0.012 inches in diameter. In some embodiments, the plurality of features 24 are each about 0.014 inches in diameter. In some embodiments, the plurality of features 24 are each about 0.016 inches in diameter. In some embodiments in which a shape different than a circle is used, the values indicated can refer to a length, width, or thickness of the features rather than a diameter.

In some embodiments, the plurality of features 24 are each between about 0.005 inches in diameter and about 0.020 inches in diameter. In some embodiments, the plurality of features 24 are each between about 0.007 inches in diameter and about 0.016 inches in diameter. In some embodiments, the plurality of features 24 are each between about 0.007 inches in diameter and about 0.012 inches in diameter. In some embodiments, the plurality of features 24 are each between about 0.010 inches in diameter and about 0.014 inches in diameter. In some embodiments, the plurality of features 24 are each between about 0.0010 inches in diameter and about 0.016 inches in diameter. In some embodiments, the plurality of features 24 are each between about 0.007 inches in diameter and about 0.014 inches in diameter. In some embodiments, all features 24 of the plurality of features 24 are about the same size as the other features 24. In some embodiments, the features 24 may be a variety of sizes compared with the other features in mold 22.

In some embodiments, the plurality of features 24 includes a density (i.e. features or waxels per inch (WPI)) greater than 50 WPI. In some embodiments, the plurality of features 24 includes a density greater than 60 WPI. In some embodiments, the plurality of features 24 includes a density greater than 70 WPI. In some embodiments, the plurality of features 24 includes a density greater than 80 WPI. In some embodiments, the plurality of features 24 includes a density greater than 90 WPI. In some embodiments, the plurality of features 24 includes a density greater than 100 WPI. In some embodiments, the plurality of features 24 includes a density greater than 110 WPI. In some embodiments, the plurality of features 24 includes a density greater than 120 WPI. In some embodiments, the plurality of features 24 includes a density greater than 130 WPI. In some embodiments, the plurality of features 24 includes a density greater than 140 WPI. In some embodiments, the plurality of features 24 includes a density greater than 150 WPI. WPI may be referred to as watermark resolution. Reference is made to U.S. Publication No. 2019/0306385 which is expressly incorporated herein in its entirety for the purpose of describing suitable watermark resolutions that may be included in mold 22.

In some embodiments, the plurality of features 24 includes a density within a range of about 50 WPI to about 200 WPI. In some embodiments, the plurality of features 24 includes a density within a range of about 75 WPI to about 175 WPI. In some embodiments, the plurality of features 24 includes a density within a range of about 100 WPI to about 160 WPI. In some embodiments, the plurality of features 24 includes a density within a range of about 125 WPI to about 160 WPI. In some embodiments, the plurality of features 24 includes a density within a range of about 125 WPI to about 150 WPI. In some embodiments, the plurality of features 24 includes a density of about 150 WPI. The term about is used herein to account for manufacturing and/or measurement tolerances and may include values within 5 percent of the values indicated above.

Figure 4B:
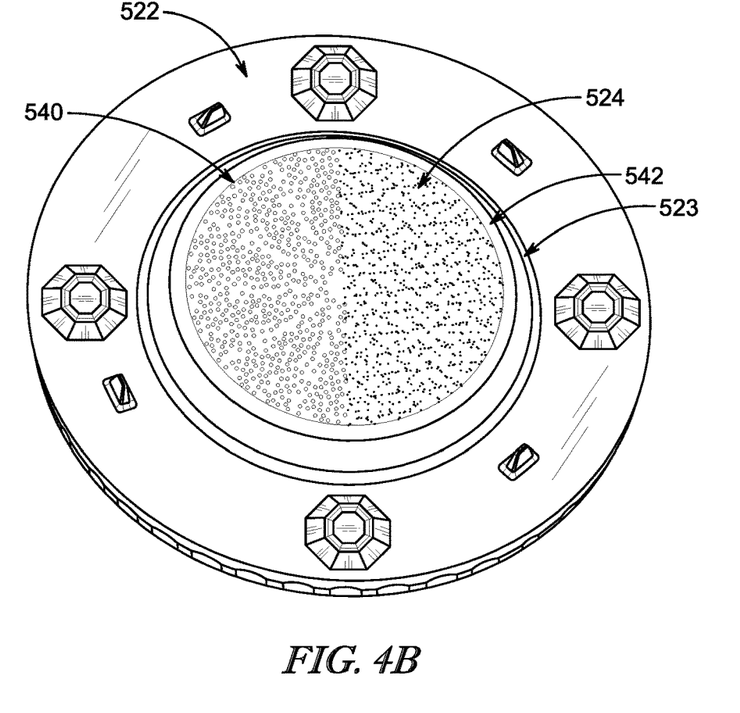
FIG. 4B is a perspective view similar to FIG. 4A showing another embodiment of a mold tool including a first section with a first pattern of features formed thereon and a second section with a second pattern of features formed thereon different than the first section.
Figure 4C:
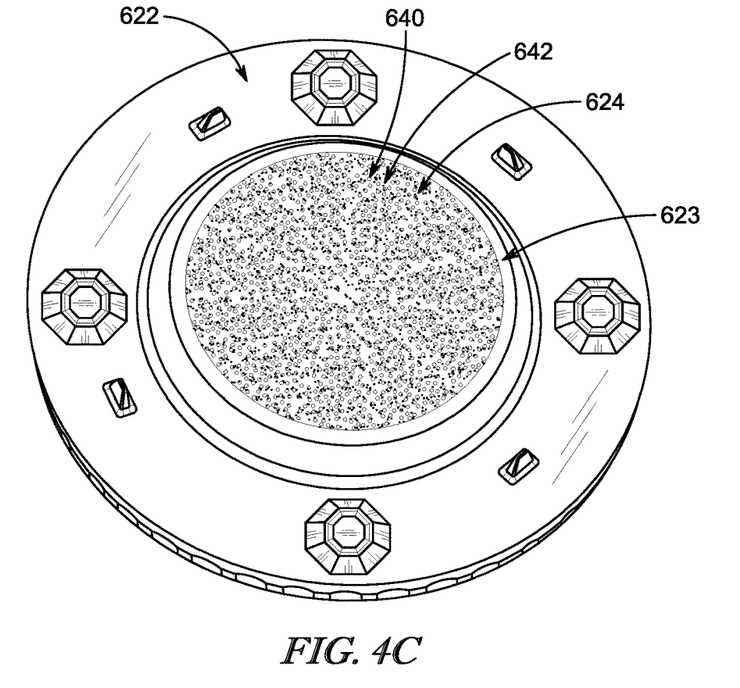
FIG. 4C is a perspective view similar to FIGS. 4A and 4B showing another embodiment of a mold tool including a first pattern of features and a second pattern of features different than the first pattern and overlaid with the first pattern of features.
Figure 4D:
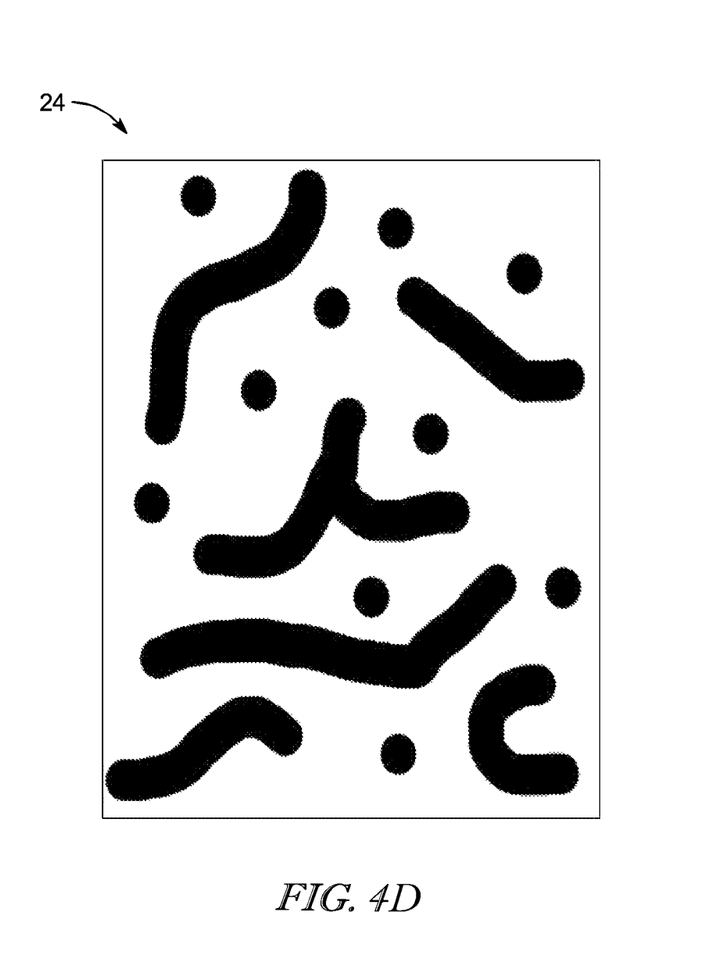
FIG. 4D is a diagrammatic view of a plurality of features arranged in one example of a pattern that can be formed on a mold.

The plurality of features 24 may include more than one pattern of features 24 on a single mold. For example, a mold 522 includes a plurality of features 524 having a first pattern 540 and a second pattern 542 separate from and different than the first pattern 540 as shown in FIG. 4B. The first pattern 540 is located on a first half of a mold dome 523 that forms central dome 16 of a lid 10 during forming stage 106. The second pattern 542 is located on an opposite second half of mold dome 523. Illustratively, the first pattern 540 is shown with each feature 524 being an open circle and the second pattern 542 is shown with each feature being a closed circle, however, it should be appreciated that these shapes are exemplary and any suitable shape may be used for features 524. In some embodiments, each feature 524 has a similar shape in both first pattern 540 and second pattern 542 and the arrangement of the features 524 is different between first pattern 540 and second pattern 542. In some embodiments, the features 524 in first pattern 540 have a different shape than the features 524 in second pattern 542. The plurality of features 524 are repeated and have shapes similar to features 24 described above, thereby increasing aesthetics of the article 10 while providing the encoded visual indicia 12.

Both the first pattern 540 and the second pattern 542 are formed on an article during the forming stage 106 to collectively provide encoded visual indicia 12 for more than one purpose. The first pattern 540 may be scanned by an optical camera of a consumer computing device 20 to generate a first set of instructions based on the first pattern 540 in the encoded visual indicia 12. The first set of instructions may cause the consumer computing device 20 to display augmented reality that allows the user to interact with the augmented environment as suggested in FIG. 2, cause an image or text to be displayed on a screen of computing device 20, cause a sound to be played from a speaker connected with computing device 20, or cause the computing device to take a user to a predetermined website. The consumer computing device 20 may include memory with preprogrammed instructions such that the second pattern 542 is ignored by the industrial computing device when scanned by the optical camera of the industrial computing device. In other embodiments, the second pattern 542 may have an arrangement that is unreadable from the optical camera of a consumer computing device (i.e. a smartphone).

The second pattern 542 of encoded visual indicia 12 may be scanned by an optical camera of an industrial computing device that is different from consumer computing device 20 to generate a second set of instructions based on the second pattern 542 in the encoded visual indicia 12. The second set of instructions may include information related to article 10 for recyclability purposes such as, for example, the materials from which article 10 is made so that the article 10 may be properly sorted. The industrial computing device may include memory with preprogrammed instructions such that the first pattern 540 is ignored from the optical camera of the industrial computing device. In other embodiments, the first pattern 540 may have an arrangement that is unreadable from the optical camera of an industrial computing device.

In another embodiment, a mold 622 includes a plurality of features 624 having a first pattern 640 and a second pattern 642 interspersed with and different from the first pattern 640 as shown in FIG. 4B. The mold 622 includes a mold dome 623 that forms central closure 16 on a lid 10 during the forming stage 106. First pattern 640 and second pattern 642 collectively provide encoded visual indicia 12 on lid or article 10. An entire surface of the article 10 includes both the first pattern 640 and the second pattern 642 such that a visual appearance of the encoded visual indicia 12 is perceived as a single pattern.

In some embodiments, computing devices may include memory with instructions that, when scanning encoded visual indicia 12 with an optical camera of the computing device, ignore one of the first pattern 640 and the second pattern 642. For example, a consumer computing device 20 may ignore second pattern 642 while an industrial computing device may ignore first pattern 640. In this way, the encoded visual indicia 12 can provide different instructions for different types of computing devices using a plurality of patterns while the overall appearance of the article is perceived as a single pattern. The plurality of features 624 are repeated and have shapes similar to features 24 described above, thereby increasing aesthetics of the article 10 while providing the encoded visual indicia 12.

In one example of an illustrative forming stage 106, a sheet 30 of polymeric material is applied to a rotary thermoformer that includes a rotor and a plurality of article molds 122 coupled to the rotor to provide an article-blank web 26 having a plurality of article preforms 28 formed therein as suggested in FIGS. 5A-5C. Molds 122 are formed to include a plurality of positive protrusion features 140 for forming encoded visual indicia 12. In other embodiments, positive, negative, or a combination of positive and negative features are used.

Each of the molds 122 may have the same pattern of features formed thereon, or one or more of the molds 122 may have a different pattern of features from the rest of the molds. Such an arrangement can also be used in other forming processes as well. In one example where the one or more molds 122 have different patterns of features, this may be used in a gaming situation.

Sheet 30 is aligned with mold 122 and a vacuum is applied to mold 122 as suggested in FIG. 5A. Sheet 30 is applied to mold 122 and portions of sheet 30 move into the plurality of protrusions 140 to provide encoded visual indicia 12 as suggested in FIG. 5B. Other portions of sheet 30 form around mold 122 to provide the lid shape of article 10. Protrusions 140 cause the protrusions in article 10 to form which provide encoded visual indicia 12. The protrusions on article 10 may have diameters about equal to the size of the protrusions 140. When a mold with features are used, such as mold 22, depressions are formed in article 10 which may be about the same diameter or size as the features 24 in the mold 22.

Sheet 30 is separated from mold 122 to provide article-blank web 26 having article preform 28 of lid 10 formed therein as suggested in FIG. 5C. Encoded visual indicia 12 remains formed in article preform 28 so that once separated from article-blank web 26, article 10 has encoded visual indicia 12 formed thereon. In the illustrative embodiment, sheet 30 is not broken by protrusions 140 or features 24 such that no air passage is formed in article 10 due to protrusions 140 or features 24. Sheet 30 may extend only partway into features 24 when a mold with features 24 is used.

As shown in FIGS. 5A-5C, rotary thermoforming stage 106 of the present disclosure is performed without plug assist or positive pressure being applied on one side of sheet 30 to form article-blank web 26. That is, no clam shell, plug, male mating mold, or female mating mold is urged toward the rotor to apply pressure to an outer face of sheet 30. Illustratively, the rotor is a one sided tooling (no external mating mold(s)). In the illustrative embodiment, a vacuum is applied to the rotor to urge sheet 30 onto the rotor. In some embodiments, the molds on the rotor are male. In some embodiments, the molds on the rotor are female.

Figure 6:
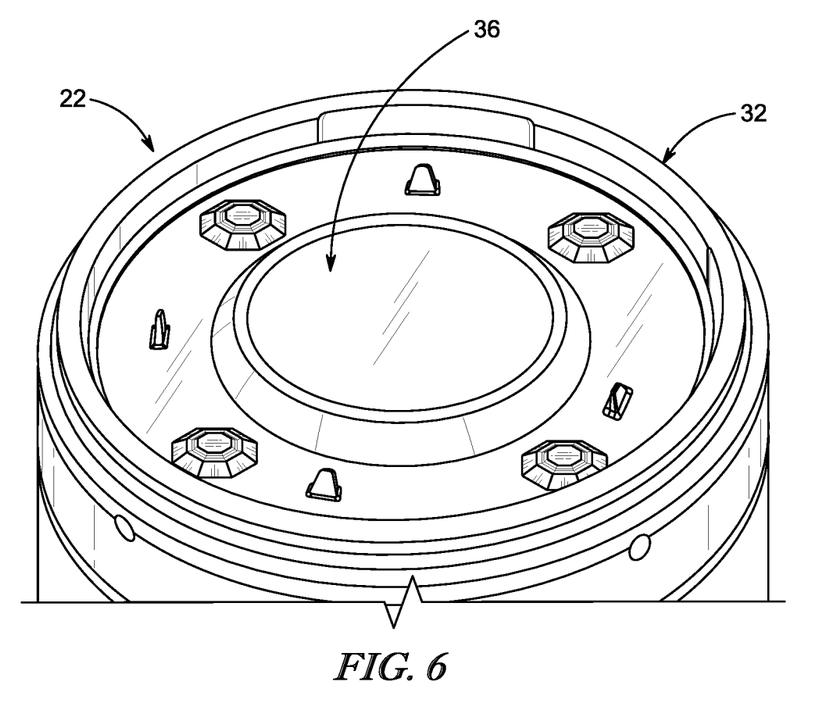
FIG. 6 is a diagrammatic view of an embodiment of the mold tool of FIG. 4A showing that a central region of the mold tool may be removed and replaced with tooling having a different pattern to provide different encoded visual indicia in the articles.
Figure 7:
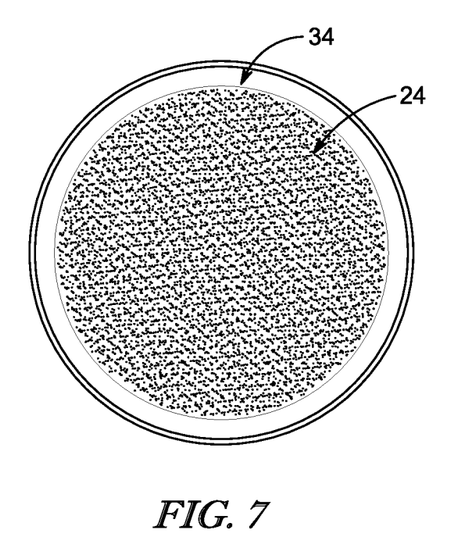
FIG. 7 is a diagrammatic view of a mold insert adapted for use with the mold tool of FIG. 6, the mold insert being dome shaped and formed to define the plurality of features for providing the encoded visual indicia in the article.

Mold 22 includes a mold body 32 as shown in FIG. 6 and a mold insert 34 as shown in FIG. 7. Mold body 32 is formed to provide brim mount 14, product-identification domes 18, and a portion of central closure 16. Mold insert 34 is received by mold body 32 for molding stage 106 and forms another portion of central closure 16. Mold insert 34 is dome shaped with a relatively flat upper surface. Mold insert 34 is formed to define the plurality of features 24 for forming encoded visual indicia 12 as shown in FIG. 7. Lid 10 formed using mold insert 34 includes encoded visual indicia 12 that corresponds with the pattern of the plurality of features 24 as suggested in FIG. 8. Mold body 32 is formed to define a receiver space 36 sized to receive mold insert 34. The plurality of features 24 may be formed on the mold body 32, the mold insert 34, or both the mold body 32 and the mold insert 34.

Mold insert 34 is removably coupled with mold body 32 so that a variety of different mold inserts 34 may be used with mold body 32. As such, different encoded visual indicia 12 may be applied to different articles 10 being formed simultaneously on the rotary thermoformer. As a result, each article 10 may have unique encoded visual indicia 12 formed thereon. Additionally, different encoded visual indicia 12 may be used with different mold bodies 32. For example, lids 10 formed using method 100 may have a first encoded visual indicia formed thereon while trays could have a different second encoded visual indicia 12 formed thereon.

Figure 9:
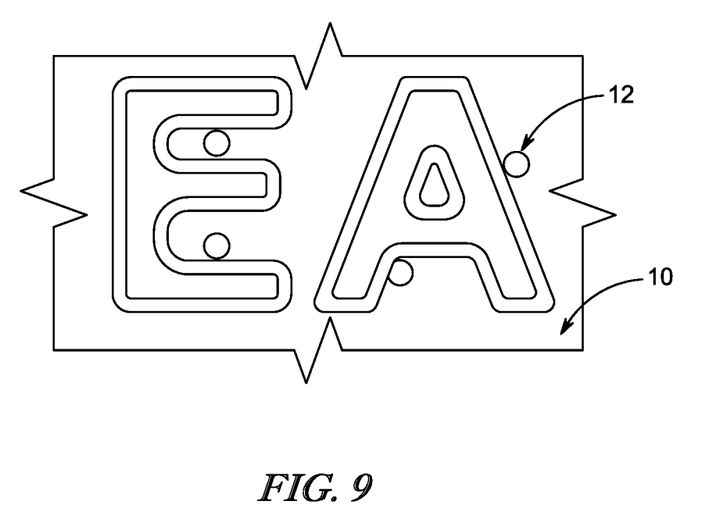
FIG. 9 is a top view of a portion of an article made with the manufacturing method of FIG. 3 showing the encoded visual indicia is formed around letters or other features of the article.

In some embodiments, the encoded visual indicia 12 is formed around features in article 10 such as text, symbols, or product-identification domes 18 as suggested in FIG. 9. Encoded visual indicia 12 may be arranged such that it appears to be a random texture or pattern on article 10 to a consumer.

Figure 10:
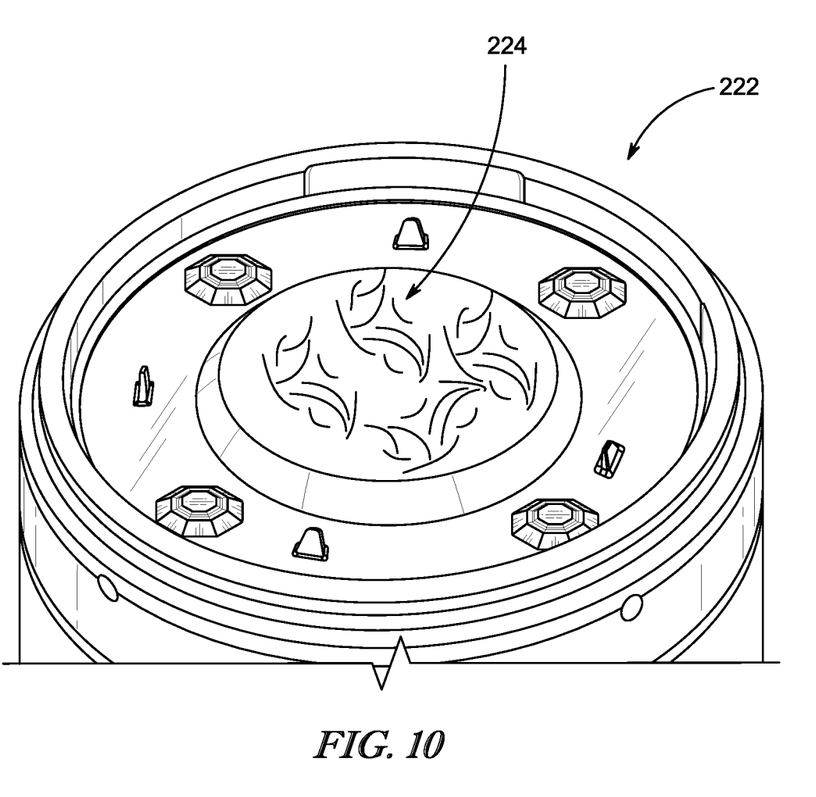
FIG. 10 is a perspective view of another mold tool for use with the molding stage of the method of FIG. 3, the mold tool having formed therein a plurality of curved slots arranged in a pattern to provide encoded visual indicia on an article.

In some embodiments, a mold 222 includes a plurality of curved slots 224 or non-circular passages 224 for forming encoded visual indicia 12 as suggested in FIG. 10. Curved slots or non-circular passages may be easier to manufacture than a plurality of features of relatively small diameter in a relatively high density pattern.

Figure 8:
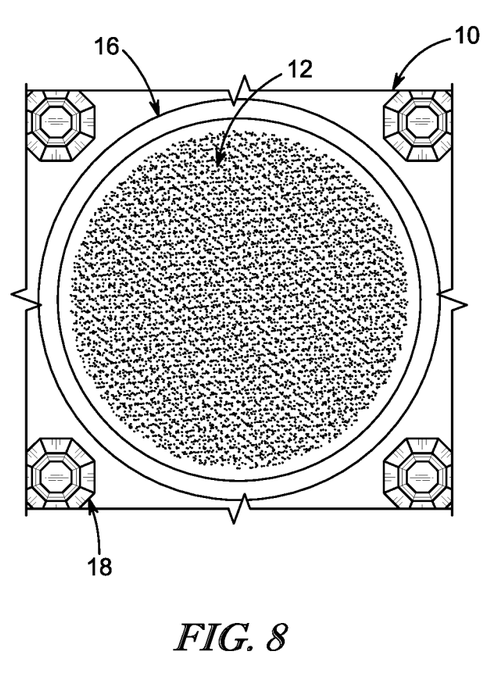
FIG. 8 is a perspective view of a portion of an article made with the mold tool of FIG. 6 and the mold insert of FIG. 7 suggesting that the encoded visual indicia corresponds with the pattern of the mold insert.
Figure 11:
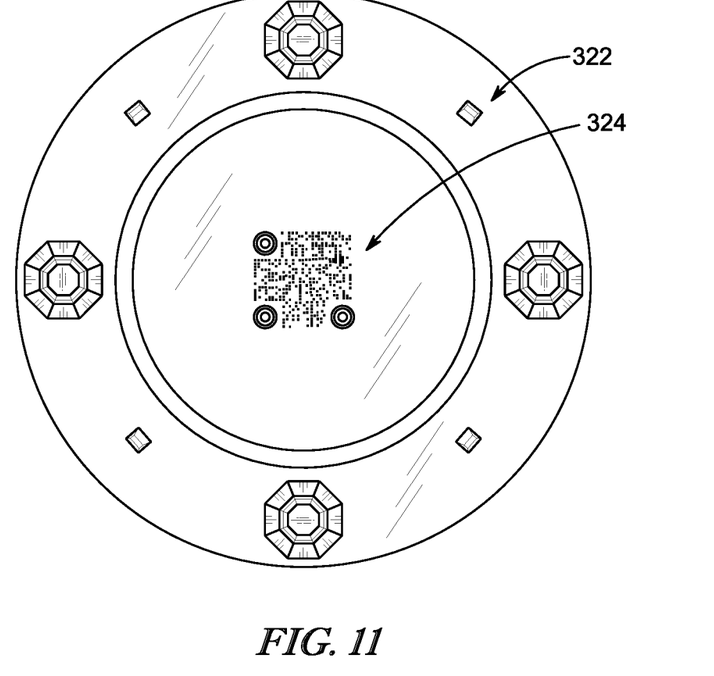
FIG. 11 is a perspective view of another mold tool for use with the molding stage of the method of FIG. 3, the mold tool having formed therein a matrix barcode pattern for forming encoded visual indicia on an article.
Figure 12:
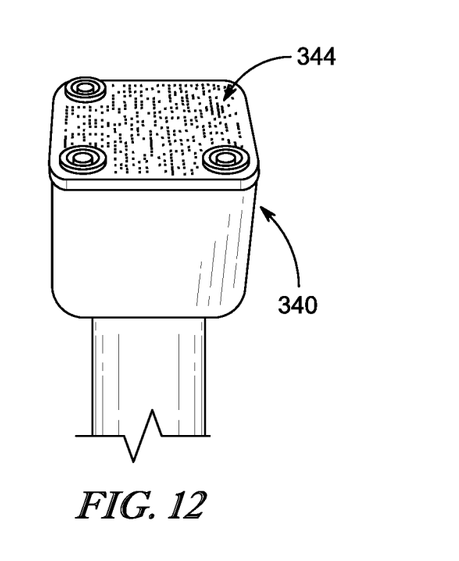
FIG. 12 is a perspective view of a embossing tool having a matrix barcode pattern formed on the tool; the embossing tool configured to be applied to the sheet or article-blank web to form the encoded visual indicia in the article.

Encoded visual indicia 12 may be any suitable pattern such as dots formed in a known arrangement as shown in FIG. 8. In some embodiments, encoded visual indicia 12 may be formed as a matrix barcode using a mold 322 having a pattern of features 324 as suggested in FIG. 11. In one example, a matrix barcode may be a QR code or any other suitable alternative. In some embodiments, an embossing tool 340 may be used alone or in combination with mold 322 to form encoded visual indicia 12 as suggested in FIG. 12. Embossing tool 340 includes male features 344 for forming encoded visual indicia 12.

Figure 13:
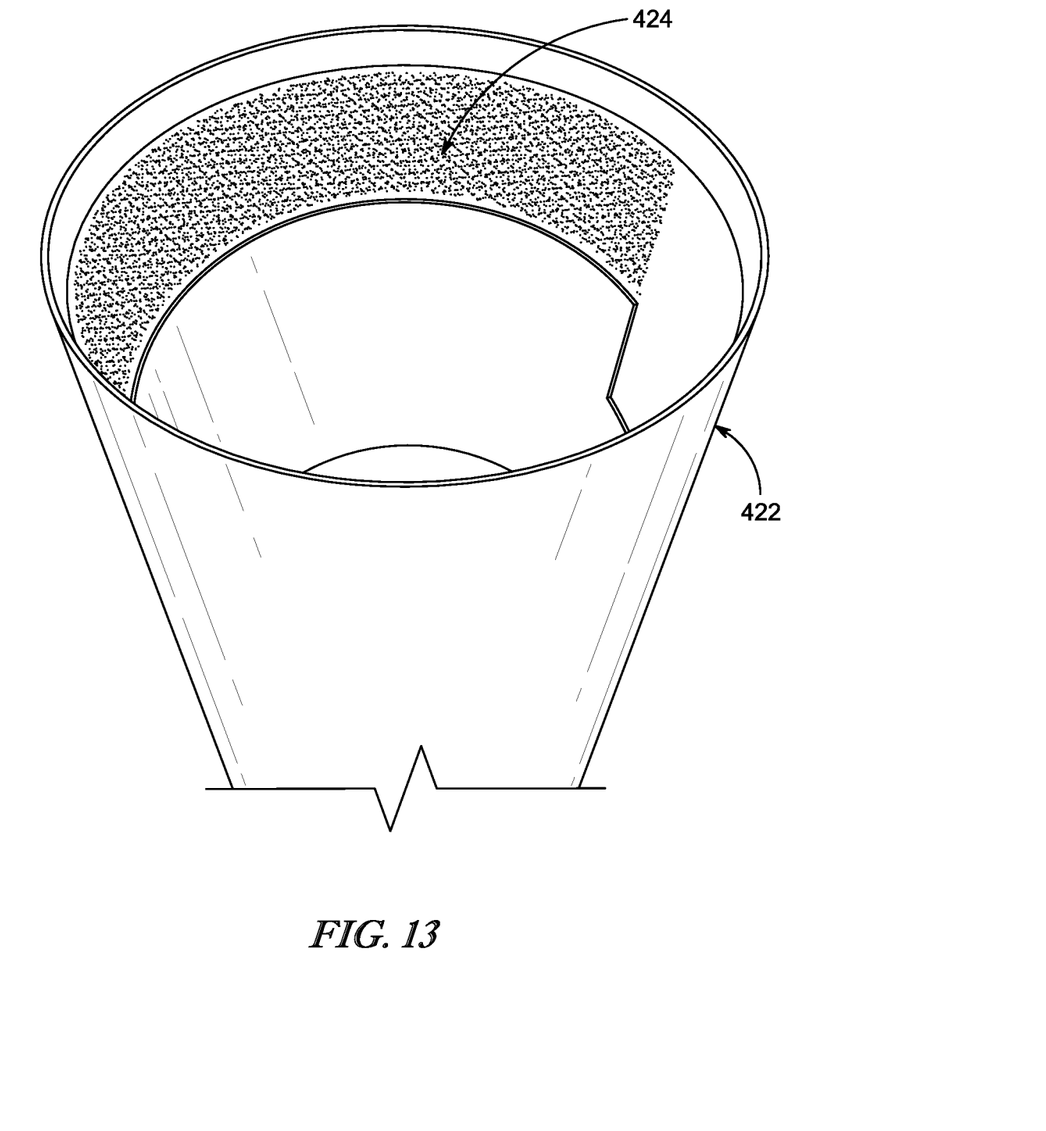
FIG. 13 is a is a perspective view of another mold tool for use in forming a container, the mold tool having formed on an inner surface thereof a plurality of features arranged in a pattern to provide encoded visual indicia on the container.
Figure 14:
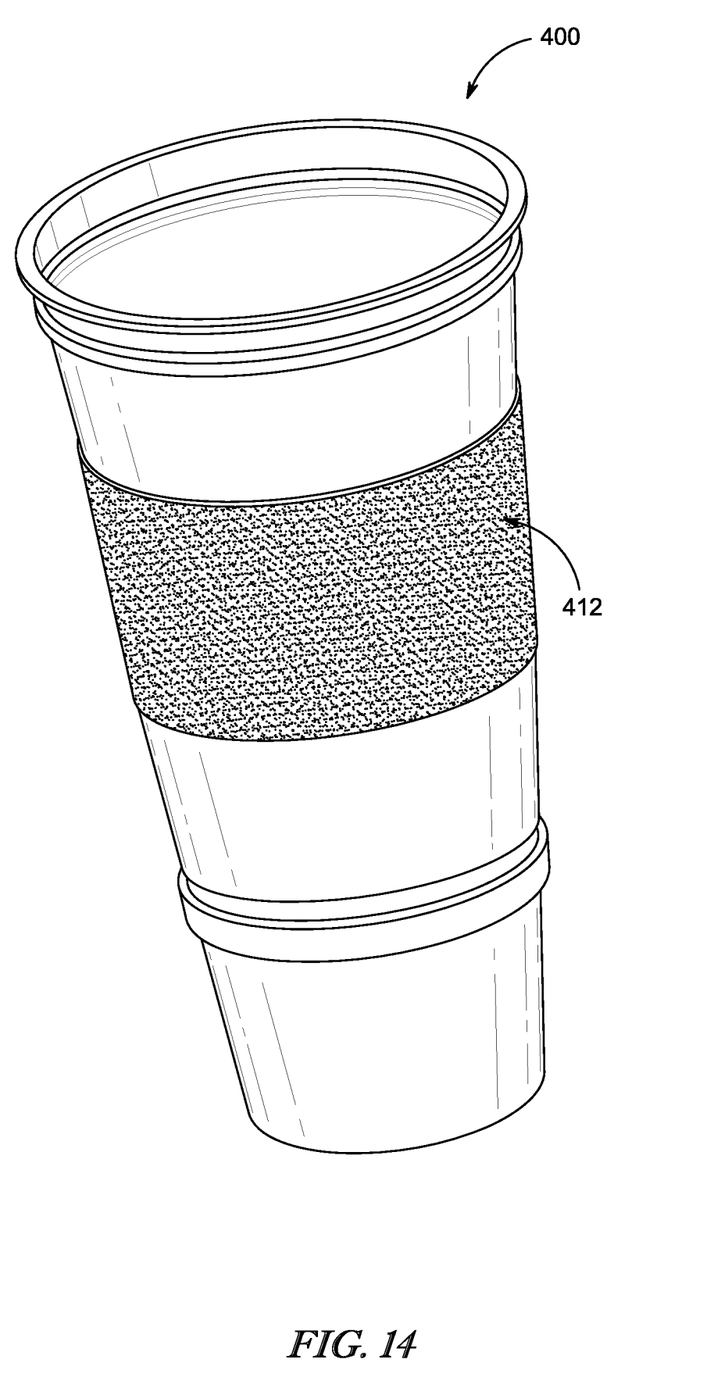
FIG. 14 is a perspective view of a container formed with the mold tool shown in FIG. 13, the container formed to include encoded visual indicia that matches a pattern of the plurality of features on the mold tool.

Other mold shapes may be used with method 100. For example, a mold 422 for bed thermoforming cups is shown in FIG. 13. Mold 422 includes a pattern 424 formed thereon for providing encoded visual indicia 412 onto a cup 410 made with mold 422 as shown in FIG. 14.

In some embodiments, mold 22, 222, 322, 422, 522, 622 includes male protrusions instead of the features or passages. The male protrusions may be circular, elongated, non-circular, or any other suitable alternative. The features 24, 224, 324, 424, 524, and 624 provided on molds 22, 222, 322, 422, 522, 622 may be formed by any suitable process such as, for example, drilling, machining, electric discharge machining, acid etching, laser etching, metal deposition, or any other suitable process. In one example, a computer numerical control (CNC) machine is programmed with one or more patterns for the plurality of features 24, 224, 324, 424, 524, and 624 and provides the features 24, 224, 324, 424, 524, and 624 in the one or more patterns on mold 22, 222, 322, 422, 522, 622 using one of the processes described above.

According to one aspect of the disclosure, a method of providing a polymeric article 10 with encoded visual indicia 12 formed thereon includes providing sheet 30 comprising polymeric materials. Sheet 30 is applied mold 22 to provide article-blank web 26 having formed therein article preform 28 and additional material arranged along article preform 28. Article preform 28 has a desired shape for the final article 10 with encoded visual indicia 12 formed in article preform 28. The method includes separating article preform 28 from the remaining material of article-blank web 26 to provide polymeric article 10 with encoded visual indicia 12 formed thereon after molding sheet 30.

Encoded visual indicia 12 may be scanned with an optical camera to cause computer readable instructions to be generated with a computer connected with the optical camera based on the scanned encoded visual indicia 12. The applying stage includes applying sheet 30 to mold 22 included on a thermoformer tool in some embodiments. The mold 22 is formed to include a plurality of features 24 and the method includes applying a vacuum to mold 22 while sheet 30 is applied to mold 22 to cause the plurality of features 24 to form encoded visual indicia 12 in the article preform 28.

It should be appreciated that each computing device described herein also includes a microprocessor, memory, and electrical circuitry. The microprocessor operates the computing device in response to signals and inputs into the computing device such as, for example, scanning encoded visual indicia 12 with an optical camera. The memory includes stored instructions that, when executed by the microprocessor, causes one or more of the instructions to execute on the computing device, such as, for example, generating the instructions described above on a screen of the computing device. The electrical circuitry interconnects all electrical components of the computing device so that signals and instructions can be transferred therebetween. In some embodiments, the electrical circuitry may include one or more antennas and transceivers for wireless communication of signals and instructions.

According to an aspect of the present disclosure, a method of providing a polymeric cup lid 10 includes providing sheet 30 comprising polymeric materials and rotary thermoforming sheet 30 onto mold 22 to provide article-blank web 26 having formed therein lid preform 28 with encoded visual indicia 12 configured to be scanned by an optical camera to generate computer readable instructions. Lid preform 28 is separated from the article-blank web 26 to provide polymeric cup lid 10 after molding sheet 30.

In illustrative embodiments, sheet 30 and, thus, thermoformed article 10 such as, for example, lid 10 is made with polymeric material. In some embodiments, the polymeric materials include one or more of polypropylene, ethylene, polyethylene, polylactic acid, polyactide, and polyethylene terephthalate. In some embodiments, polymeric materials include polystyrene. In some embodiments, polymeric materials include high impact polystyrene. In illustrative embodiments, article 10 is transparent.

In some embodiments, sheet 30 and, thus, thermoformed article 10 is made from non-aromatic polymeric materials such that article 10 is free from polystyrene. In other words, article 10 is free from aromatic materials in some embodiments. As used herein, the term non-aromatic polymer refers to a polymer that is devoid of aromatic ring structures (e.g., phenyl groups) in its polymer chain. A non-aromatic polymeric material is a polymeric material free of aromatic polymers, styrenenic polymers, or polystyrene. In illustrative examples, the non-aromatic polymeric materials include polypropylene.

Aromatic molecules typically display enhanced hydrophobicity when compared to non-aromatic molecules. As a result, it would be expected that a polypropylene-based polymeric material instead of a polystyrene-based polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based polymeric materials would be found in another aromatic polymer rather than in a non-aromatic polymer.

The use of non-aromatic materials may affect recyclability, insulation, microwavability, impact resistance, or other properties. At least one potential feature of an article formed of non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. In contrast, a polystyrene article may not be recyclable. In one example, an article made from non-aromatic or styrene-free materials may simplify recycling.

The invention claimed is:

1. A method of providing and using a polymeric article with an encoded visual indicia formed thereon, the method comprising providing a sheet comprising polymeric materials, applying the sheet to a mold to provide an article-blank web having formed therein an article preform of a desired shape with the encoded visual indicia formed in the article preform, the encoded visual indicia adapted to be scanned by a computing device to generate instructions from the encoded visual indicia, and separating the article preform from the article-blank web to provide the polymeric article with the encoded visual indicia formed thereon after molding the sheet, wherein the applying step includes applying the sheet to the mold included on a rotary thermoformertool, wherein the rotary thermoformertool is a one sided tool such that pressure is only applied to one side of the sheet by the rotary thermoformer tool and no external mating mold applies the pressure to an outer face of the sheet, wherein the mold includes a plurality of features for forming the encoded visual indicia, and each feature of the plurality of features has a width of about 0.007 inches to about 0.016 inches, the width measured along a surface of the mold where the plurality of features are formed, wherein each feature of the plurality of features has a height within a range of about 0.005 inches to about 0.015 inches and has a waxels per inch within a range of about 75 waxels per inch to about 175 waxels per inch.

2. The method of claim 1, further comprising scanning the encoded visual indicia with an optical camera and generating computer readable instructions with a computing device connected with the optical camera based on the scanned encoded visual indicia.

3. The method of claim 2, wherein the computing device is a mobile device and the computer readable instructions cause the mobile device to display an image on a screen of the mobile device.

4. The method of claim 2, wherein the computing device is a mobile device and the computer readable instructions cause the mobile device to open a predetermined website and display the predetermined website on a screen of the mobile device.

5. The method of claim 1, wherein the polymeric article is one of a cup lid, a cup, a bowl, a plate, or a tray.

6. The method of claim 1, wherein the method includes applying a vacuum to the mold while the sheet is applied to the mold to cause the plurality of features in the mold to form the encoded visual indicia in the article preform.

7. The method of claim 1, wherein the separating step includes separating the article preform from a remaining portion of the article-blank web to provide the polymeric article with the encoded visual indicia formed thereon, the remaining portion of the article-blank web including a second article preform formed therein.

8. The method of claim 1, wherein the encoded visual indicia includes a first pattern of features and a second pattern of features different than the first pattern of features, the method further comprising scanning the first pattern of features of the encoded visual indicia with a first optical camera to generate a first set of instructions and scanning the second pattern of features of the encoded visual indicia with a second optical camera to generate a second set of instructions different than the first set of instructions.

9. The method of claim 1, wherein the polymeric materials include polypropylene.

10. A method of providing a polymeric article with an encoded visual indicia formed thereon, the method comprising steps of applying polymeric materials to a mold to provide an article preform of a desired shape, forming the encoded visual indicia and a plurality of product identification domes separate from the encoded visual indicia in the article preform with the mold by rotary thermoforming, scanning the encoded visual indicia with an optical camera and generating a first set of computer readable instructions with a first computing device connected with the optical camera based on the scanned encoded visual indicia, wherein the mold includes a plurality of features formed therein for forming the encoded visual indicia on the article preform during the forming step each feature of the plurality of features has a width of about 0.007 inches to about 0.016 inches, the width measured along a surface of the mold where the plurality of features are formed, wherein the forming step includes applying a suction force to a bottom side of the polymeric materials contacting the mold by a vacuum to urge the polymeric materials onto the mold such that pressure is not applied to a topside of the polymeric materials opposite the bottomside, wherein the encoded visual indicia includes a first pattern of features and a second pattern of features separate from and different than the first pattern of features, the scanning step includes scanning the first pattern of features with the optical camera of the first computing device to generate the first set of computer readable instructions and scanning the second pattern of features with an optical camera of a second computing device to generate a second set of computer readable instructions different from the first set of computer readable instructions, wherein the second set of computer readable instructions includes information regarding the polymeric materials, the first pattern of features is unreadable by the optical camera of the second computing device, and the second pattern of features is unreadable by the optical camera of the first computing device.

11. The method of claim 10, further comprising a step of forming the plurality of features on the mold by one of machining, electrical discharge machining, acid etching, and laser etching prior to the step of applying.

12. The method of claim 11, wherein the article preform is a polymeric cup lid that includes a ring-shaped brim mount configured to mate with a cup and a central closure extending from the ring-shaped brim mount and configured to close an open mouth of the cup.

13. The method of claim 10, wherein each feature of the plurality of features is circular and has a width between about 0.005 inches and about 0.020 inches.

14. The method of claim 10, wherein the plurality of features include a density within a range of about 100 waxels per inch to about 160 waxels per inch.

15. The method of claim 10, wherein the plurality of features include a density within a range of about 125 waxels per inch to about 150 waxels per inch.

16. The method of claim 10, wherein the first pattern of features and the second pattern of features are interspersed with one another on the polymeric article.

* * * * *